May 6, 1941. J. D. SPALDING 2,240,741
DRAWWORKS
Filed Feb. 5, 1940 2 Sheets-Sheet 1
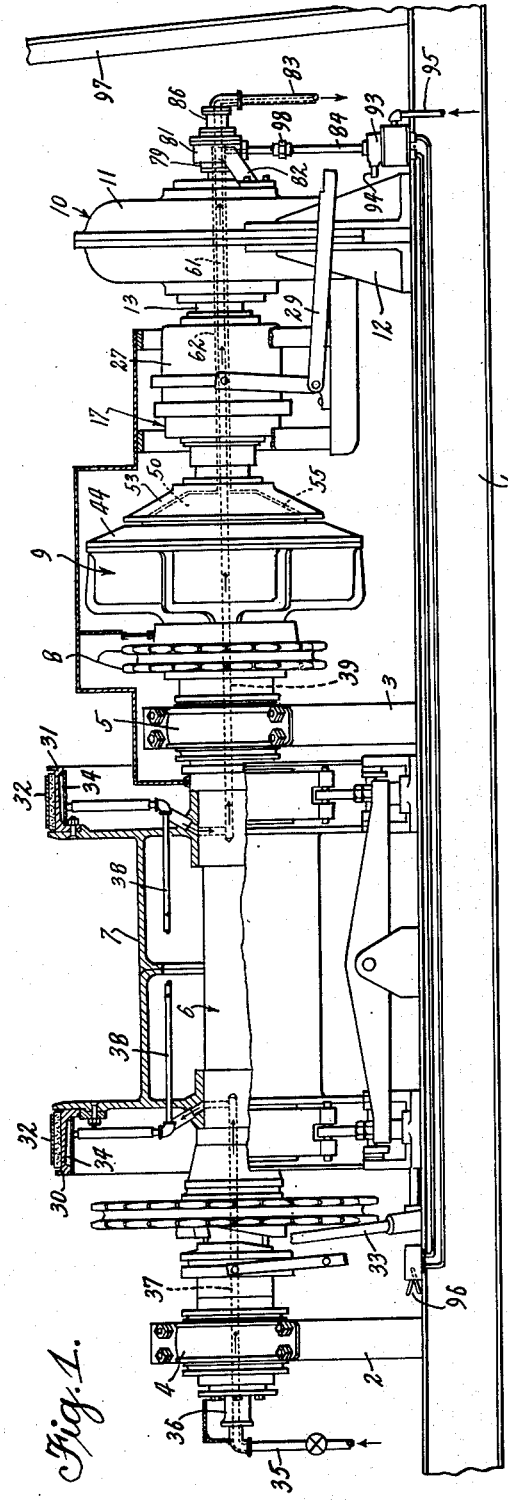
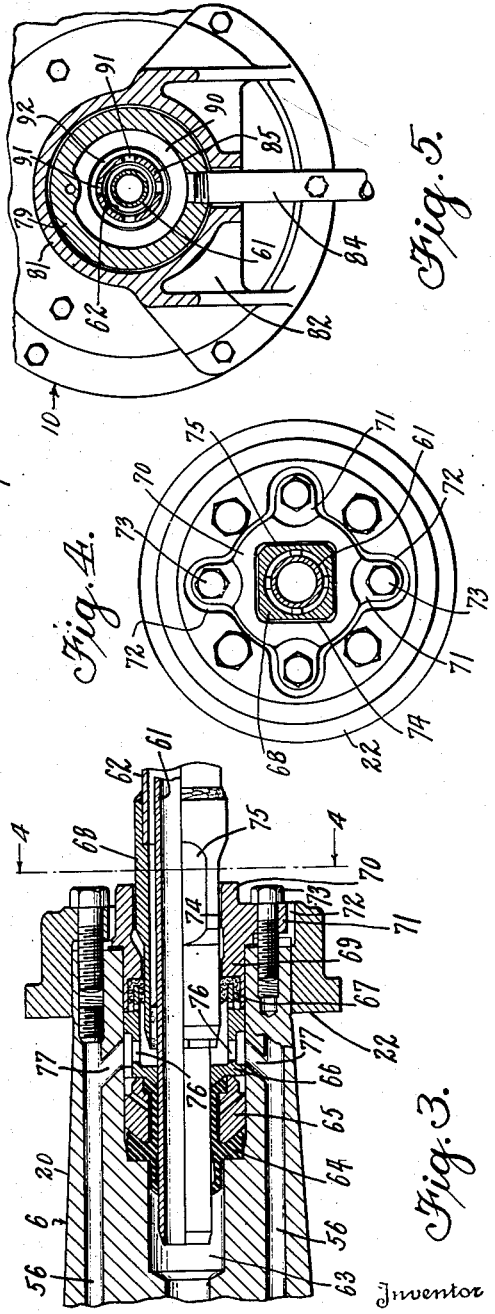
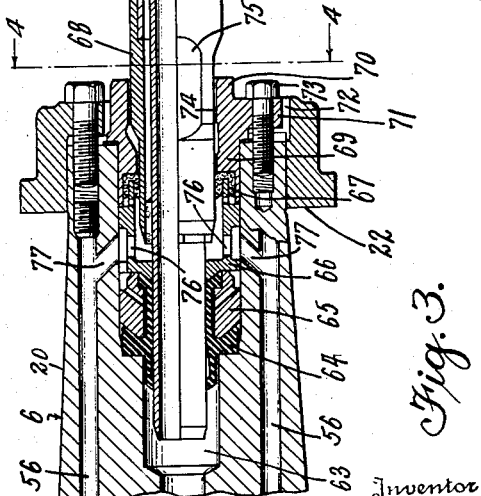
Inventor
John D. Spalding
By Lyon & Lyon
Attorneys May 6, 1941.    J. D. SPALDING    2,240,741
DRAWWORKS
Filed Feb. 5, 1940    2 Sheets-Sheet 2
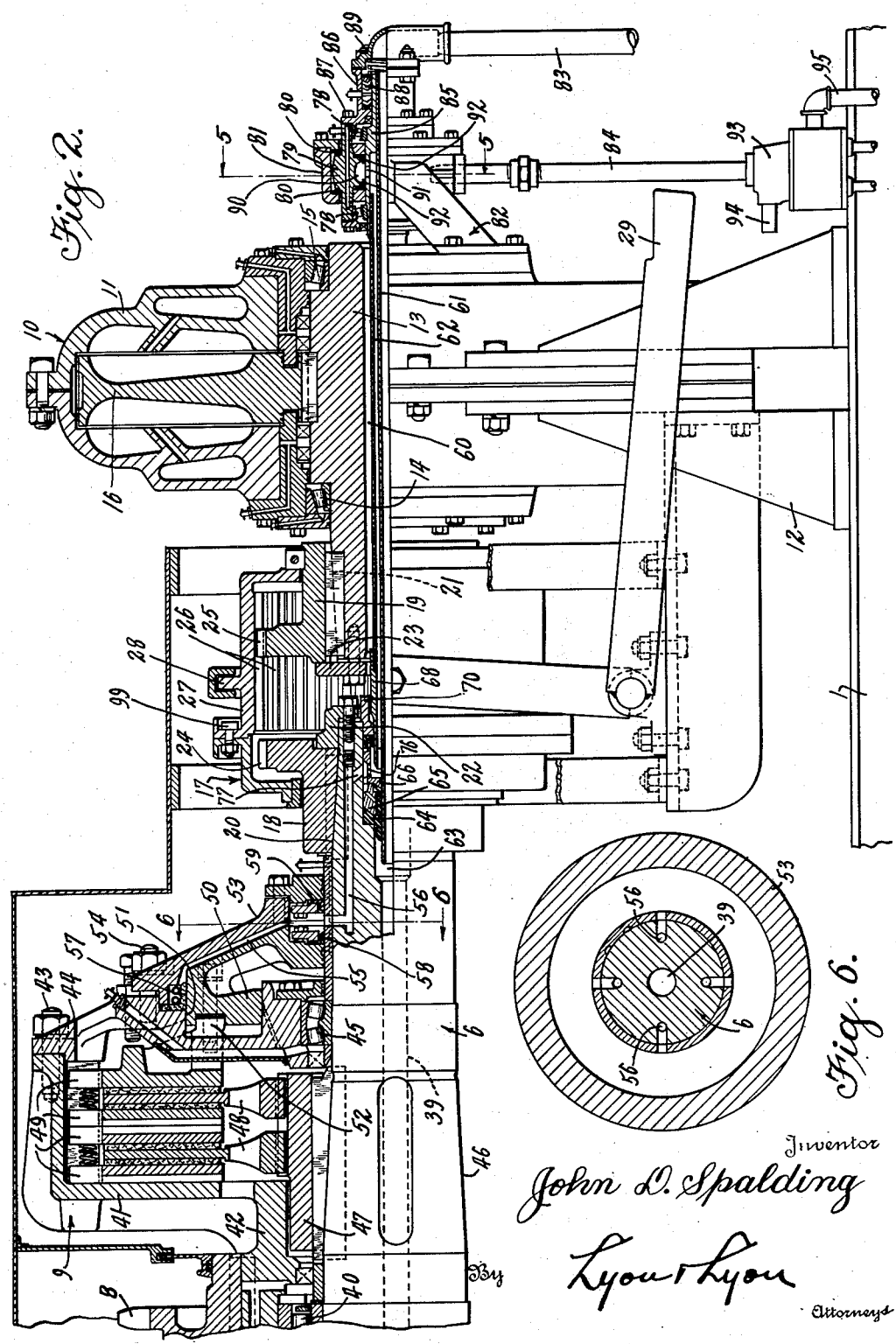
Inventor
John D. Spalding
By Lyon & Lyon
Attorneys Patented May 6, 1941

2,240,741

UNITED STATES PATENT OFFICE 2,240,741

DRAWWORKS

John D. Spalding, Los Angeles, Calif., assignor to The National Supply Company, Pittsburgh, Pa., a corporation of Pennsylvania Application February 5, 1940, Serial No. 317,313

12 Claims. (Cl. 254—187)

This invention relates to drawworks and hoisting apparatus, and is particularly adapted for incorporation in the drawworks utilized in well drilling. More specifically this invention is directed to the construction of a drawworks or hoisting apparatus wherein fluids are introduced within the apparatus through passageways disposed within the rotating supporting shaft. The hoisting or spooling drum ordinarily utilized in drawworks is provided with a drive means and a brake means. The drive means often includes a shaft which supports the drum and a drive sprocket adapted to be releasably connected to rotate the drum incorporating a releasable fluid-operated clutch as the connecting means.

The brake means of such a hoist or drawworks, particularly as the same is adapted for well drilling but not necessarily limited thereto, includes a pair of friction brakes and a means for circulating a brake-cooling fluid.

In structures of this character, as the operating parts are principally rotating, the cooling and actuating fluids are commonly introduced in the passageway formed in the shaft upon which the spooling drum is supported. The introduction of these fluids into such an apparatus presents no great problem when the shaft ends are exposed and accessible, as in this case the fluids may be introduced without serious difficulty in the passageways formed in the shaft. When, however, one or more of the ends of the shaft are non-accessible, the problem of introducing fluid into the passageways has not heretofore been satisfactorily solved. Specifically this problem has arisen in drawworks construction where an end of the drum supporting shaft is coupled to a second shaft positioned substantially in end to end relation therewith. This second shaft may carry an auxiliary braking means. It is accordingly an object of this invention to provide a drawworks including a means for introducing a fluid into a passageway formed from the end of a rotatable shaft where the shaft is connected in end to end relation with a second rotatably mounted shaft.

Another object of this invention is to provide apparatus of the character set forth which includes a tube insertable axially through a bore formed through one of a pair of aligned shafts to form an operative connection with a passage formed in the other aligned shaft.

Another object of this invention is to provide a drawworks structure incorporating an auxiliary brake mounted on a shaft coupled in end to end relation with the shaft supporting the hoisting drum wherein a fluid conveying tubular device is insertable axially through a bore formed in the brake shaft into engagement within the end of the drumshaft.

Another object of this invention is to provide a hoisting device including such a brake device wherein the brake device including its shaft may be removed from operative engagement with respect to the shaft of the hoisting device in a direction other than axially of its shaft upon effecting a disengagement of an insertable tubular device from the end of the drum supporting shaft.

Other objects and advantages of this invention it is believed will be apparent from the following detailed description of a preferred embodiment thereof as illustrated in the accompanying drawings.

In the drawings:

Figure 1 is a front elevation partly in vertical midsection of the drawworks embodying my invention.

Figure 2 is an enlarged sectional elevation of the right-hand portion of the structure as illustrated in Figure 1.

Figure 3 is an enlarged detail sectional elevation of the fluid passageways and connections provided at the end of the drum supporting shaft.

Figure 4 is a sectional end view taken substantially on the line 4—4 of Figure 3.

Figure 5 is a sectional end view taken substantially on the line 5—5 of Figure 2.

Figure 6 is a sectional end view taken substantially on the line 6—6 of Figure 2.

As illustrated in the drawings, the drawworks or hoisting apparatus includes a frame 1 providing spaced bearing supports 2 and 3 upon which shaft bearings 4 and 5 are carried. Rotatably supported in the bearings 4 and 5 is a drum shaft 6 upon which there is mounted a spooling drum 7.

As in such structures, the hoisting drum 7 is supported between the bearings 4 and 5. The shaft 6 projects beyond the support 3 and overhangs the bearing 5. Supported upon the overhanging portion of the drum shaft 6 is the drive sprocket 8 and a fluid operated clutch 9 provided for releasably connecting the sprocket 8 to the shaft 6.

A fluid brake 10 which may be of any suitable or desirable construction such, for example, as that shown or described in the De La Mater Patent No. 1,992,911, issued February 26, 1935, is supported on the frame 1 independently of the bearings 4 and 5.

The fluid brake includes a stationary housing 11 mounted upon a bracket 12 secured to the frame 1. The rotating shaft 13 of the fluid brake is supported by bearings 14 and 15 carried by the housing 11. The fluid brake shaft or stub shaft 13 is secured to the rotor 16 to rotate therewith. The bracket 12 is positioned upon the frame 1 in a manner to bring the shafts 6 and 13 into substantially end to end axial alignment.

A self-aligning coupling 17 of any suitable or desirable design is adapted to form a releasable driving connection between the adjacent ends of the shafts 6 and 13.

As illustrated, the coupling collars or hubs 18 and 19 are keyed upon tapered seats 20 and 21 formed on the ends of the shafts 6 and 13, respectively, and clamping members 22 and 23 are provided for preventing displacement of the said coupling hubs or collars. The hubs 18 and 19 are provided with external teeth 24 and 25, respectively. Internal teeth 26 are formed on the interior of the housing 27 to engage with the teeth 24 and 25, respectively. The housing 27 is longitudinally shiftable by means of a shifter mechanism 28 and shifting lever 29 to accomplish selective engagement of the teeth 24, and 26.

It will be apparent from the foregoing description that the coupling 17 will act to drivingly connect the shafts 6 and 13 even though the said shafts may not be in exact alignment. The hoisting drum 7 carries spaced brake rims 30 and 31 over which friction bands 32 are trained in any suitable or desirable manner well understood in this art.

Means including the lever 33 are provided of conventional form for tightening the bands 32 to hold the drum 7 from rotation. Passages 34 are provided within each brake rim for circulating cooling fluid therein. The cooling arrangement may be of any suitable or desirable construction, for example, like that disclosed in the United States Patent No. 1,918,501 to John D. Spalding.

As illustrated in the drawings, an inlet pipe 35 passes through a stuffing box 36 and into communication with the fluid passage 37 formed in the drum shaft 6. The passage 37 is connected to the brake rim passages 34 by means of suitable piping 38. A similar fluid passage 39 is formed in the other end of the drum shaft 6 and provides a discharge passage for the cooling liquid from the rim passages 34. It will be obvious that the indicated direction of flow of the fluid is not critical but might be reversed, the particular designation given to said passageways being merely one of convenience.

The fluid-operated clutch 9 is provided for releasably connecting the drive sprocket 8 in driving relation with the overhanging portion of the drum shaft 6. This clutch 9, as illustrated, includes a clutch housing 41 having a longitudinally extending hub 42 at one side supported by bearing 40. Secured to the other side of the clutch housing 41 by any suitable means, as indicated at 43, is the end member 44. The end member 44 is mounted on bearing 45, so that in effect the clutch housing 41 is rotatably supported on spaced bearings 40 and 45. The sprocket 8 is fixed upon the hub 42.

Secured upon the tapered portion 46 of the shaft 6 is a clutch collar 47. Splined to the clutch collar 47 are the clutch friction rings 48. Complementary clutch rings 49 are splined to the clutch housing 41. When the rings 48 and 49 are brought into mutual engagement by axial pressure, the friction surfaces transmit rotary motion from the housing 41 to the shaft 6. Fluid-pressure operating means is preferably provided for crowding the rings 48 and 49 together, and as illustrated, this fluid-operating means may include an annular piston 50 slidably mounted within the annular bore 51 formed in the end member 44. Abutments 52 on the outer ring 49 extend through openings in the end member 44 into engagement with the piston 50. A cover member 53 is secured to the end member 44 by means of bolts 54 and defines an annular clearance space 55 adjacent the back side of the piston 50. Actuating fluid, which may be compressed air, is admitted into the clearance space 55, thereby causing axial movement of the piston 50 to force the clutch plates 48 and 49 into engagement.

A plurality of fluid passageways 56 are formed in the over-hanging portion of the shaft 6 in communication with the annular space 55. Sealing means 57, 58 and 59 are provided to prevent leakage of the actuating fluid.

The fluid passageways 39 and 56 which lead to the end of the overhanging portion of the shaft 6 are not directly accessible because of the presence of the coupling 17 which connects the adjacent ends of the shafts 6 and 13.

Means are provided which includes tubular means axially insertable through a passageway 60 formed in the shaft 13 to within the end of the overhanging portion of the shaft 6 for introducing the cooling and actuating fluids into their respective passageways.

As herein illustrated, this tubular means includes inner and outer concentrically disposed tubular elements 61 and 62, respectively. As illustrated, the cooling liquid or fluid is introduced through the inner tubular member 61 and the brake-actuating fluid is introduced through the outer tubular member 62. Sealing means are provided so that operative engagement of the tubes 61 and 62 with their respective passageways can be effected solely by inserting the tubular member axially into position. As illustrated, this means includes an enlarged bore 63 formed at the outer end of the passage 39 of the drum shaft 6. Mounted within this enlarged bore at the inner end is a rubber sealing ring 64 adapted to receive the end of the inner tubular member 61.

A metallic spacer 65 surrounds a reduced portion of the rubber sealing ring 64 and contacts a lantern sleeve 66. The lantern sleeve 66 carries an annular U-packing 67 adapted to seal about the inner end of the adapter 68 carried upon the inner end of the outer tubular member 62. The packing assembly thus described is maintained within the enlarged bore 63 by means of an annular projection 69 of the follower ring 70.

The follower 70 has a plurality of laterally extending supporting ears 71 adapted to be received within recesses 72 formed in the end of the clamping member 22. Cap screws 73 in the ears 71 connect the follower 70 to the shaft 6. The follower 70 is provided with a squared aperture 74 adapted to receive the squared section 75 of the adapter 68 to provide a driving connection between the follower 70 and the tubular insertable assembly. This driving connection it will be apparent is established by the mere insertion of the said tubular assembly into position. Thus the fluid seal required at this point of insertion is not a seal between relatively rotating members and may thus be more easily established and maintained. Communication from the inner tubular member 61 to the passage 39 is established directly in the enlarged bore 63. Communication between the interior of the outer tubular member 62 and the passages 56 is established from within the lantern sleeve 66 through ports 76 formed therethrough and communicating ports 77 formed between the ports 76 and 56.

The assembly of the tubular members 61 and 62 is inserted through the axial bore 60 of the shaft 13. The bore 60 is large enough to provide ample clearance for this tubular assembly even though the shafts 6 and 13 may not be in exact alignment.

The outer end of this tubular assembly is rotatably supported in spaced bearings 78 carried in the housing 79. The housing 79 is resiliently supported between the rubber rings 80 carried in the supporting ring 81. The supporting ring 81 is in turn secured to the stationary housing 11 of the fluid brake 10 by means as indicated at 82. Means are provided upon this projecting end of this tubular insertable assembly for establishing communication with the fluid conducting pipes 83 and 84 and for sealing the respective tubes 61 and 62 with respect to the stationary elements of this communication establishing means.

The assembly is supported with respect to the bearings 78 by an adapter 85 secured to the outer end of the tubular member 62. This adapter is likewise secured to the projecting end of the tubular member 61. A cap 86 is secured to the housing 79 as indicated at 87, and between the cap 86 and adapter 85 there is provided a packing assembly 88. The cap 86 is secured to the conduit 83 as indicated at 89.

An annular recess 90 within the housing 79 communicates through ports 91 with the interior of the outer tubular member 62. The conduit 84 is connected with the housing 79 and with the annular chamber 90. Packing means as indicated at 92 seals the chamber 90 with relation to the housing 79. The conduit 84 as illustrated conducts the brake-actuating fluid and is provided with a control valve 93 provided with the fluid intake 94 and fluid exhaust 95, respectively. The control valve 93 is adapted to be actuated by the control pedals 96 at the operator's position.

As ordinarily installed, the hoisting apparatus or drawworks as indicated is positioned within a derrick usually in close proximity to a derrick rig as indicated at 97. If for any reason it becomes desirable to remove the fluid brake 10 from the frame 1, the union 98 in the conduit 84 is disconnected and the connecting means 82 is removed. The assembly of the tubular members 61 and 62 is then withdrawn until no portion of it remains within the bore of the shaft 6. The parts as thus described are so proportioned that this disengagement may be effected before any part of the assembly strikes the face of the derrick leg 97. The coupling 17 is then disconnected by removal of the bolts 99 which connect the two separable portions of the housing 27. The fluid brake 10, together with its shaft 13, may then be readily removed from the frame 1 in any preferred direction.

In this respect, it will be noted that the fluid brake 10 with its attendant parts is readily removed from the frame 1 because the tubular members 61 and 62 may be detached from connection with the drum shaft 6. If the tubular members 61 and 62 were not made detachable, moving of the fluid brake 10 would be a difficult operation because it would have to be "threaded" axially along the tubular members 61 and 62 to effect disengagement. The relatively great weight and size of the structures as illustrated compared to the long, thin, and relatively fragile tubes 61 and 62, would mean that the said tubes would be certainly damaged if any such "threading" operation were attempted. As ordinarily installed also, the proximity of the derrick leg 97 would prevent such a "threading" operation.

Having fully described my invention, it is to be understood that I do not wish to be limited to the details herein set forth, but my invention is of the full scope of the appended claims.

I claim:

1. In a hoisting mechanism, the combination of a pair of rotatable shafts independently mounted and positioned substantially in end-to-end axial alignment, coupling means for effecting a driving engagement between adjacent ends of said shafts, one of said shafts having formed therein a passageway for conveying a fluid, the other of said shafts having an axial bore extending therethrough, and a fluid conducting tube positioned within said bore and insertable axially into operative engagement with said passageway.

2. In a hoisting mechanism, the combination of a pair of rotatable shafts positioned substantially in co-axial alignment, releasable coupling means for selectively effecting a driving engagement between said shafts, the first of said shafts having formed therein a passageway for conveying a fluid, the second of said shafts having an axial bore extending therethrough, a fluid conducting tube positioned within said bore, resilient sealing means associated with said first shaft whereby the tube and said passageway may be operatively connected through axial movement of the tube, and cooperating parts associated with the tube and said first shaft adapted to form a driving engagement therebetween upon insertion of said tube into sealing position.

3. In a hoisting assembly, the combination of a pair of shafts positioned substantially in end-to-end axial alignment, releasable coupling means for selectively effecting a driving engagement between adjacent ends of said shafts, one of said shafts having formed therein a passageway for conveying a fluid, the other of said shafts having an axial bore extending therethrough, a fluid conducting tube operatively connected with said shaft passageway and extending longitudinally through said bore, the tube being adapted to be withdrawn axially from said shaft passageway to permit the other shaft and tube to be dismantled from said assembly by movement in a radial direction.

4. In a hoisting mechanism, the combination of a pair of rotatable shafts positioned substantially in end-to-end axial alignment, coupling means for effecting a driving engagement between adjacent ends of said shafts, one of said shafts having a plurality of fluid conducting passageways formed therein, the other of said shafts having an axial bore extending therethrough, a plurality of concentric fluid conducting tubes within said bore, means including a plurality of spaced sealing means whereby each of said tubes may be operatively connected to a corresponding passageway through relative axial movement, and means associated with one of said shafts adapted to rotate said tubes.

5. In a hoisting mechanism having a pair of rotatable shafts independently supported and positioned in substantially end-to-end axial alignment, the combination of coupling means adapted to form a driving connection between adjacent ends of said shafts, means including a passageway in the first of said shafts for conveying a fluid, a bore extending axially through the second of said shafts, a tube insertable axially through said bore and adapted to traverse the gap between the shaft ends, means including a fluid seal whereby the tube and said passageway may be operatively connected through relative axial movement, drive means adapted to form a driving connection between the tube and said first shaft, and means positioned at the opposite end of said second shaft from said coupling means for rotatably supporting said tube.

6. In a hoisting mechanism, the combination of a pair of shafts positioned in substantially end-to-end axial alignment, a spooling drum fixed on the first shaft and a fluid brake associated with the second shaft, bearing means for supporting said shafts independently, releasable coupling means adapted to form a driving connection between adjacent ends of said shafts whereby the fluid brake may be selectively connected to impede rotation of the spooling drum, means including a passageway in the first of said shafts for conveying a fluid, a bore extending axially through the second of said shafts, a tube axially insertable through the bore of said second shaft into operative engagement to form a continuation of said passageway, sealing means adapted to prevent leakage at the junction of said tube and passageway, and means positioned adjacent the opposite end of said second shaft from said coupling means for supporting said tube.

7. In a drawworks, the combination of a first shaft rotatably supported by axially spaced bearing means, a second shaft having an axial bore therethrough, means independent of said spaced bearing means for rotatably supporting said second shaft substantially in axial end-to-end alignment with said first shaft, a fluid brake associated with said second shaft, releasable coupling means adapted to form a driving connection between adjacent ends of said shafts, whereby the fluid brake may be selectively connected to impede rotation of the first shaft, means including a passageway in said first shaft for conveying a fluid, a tube insertable through the bore of said second shaft and adapted to traverse the gap between the shaft ends, means including resilient sealing means whereby the tube and said passageway may be operatively connected through relative axial movement, drive means adapted to form a driving connection between the tube and said first shaft, and means positioned at the opposite end of said second shaft from said coupling means for rotatably supporting said tube.

8. In a hoisting mechanism, the combination of a pair of rotatable shafts independently mounted and positioned substantially in end to end axial alignment, coupling means for effecting a driving engagement between the adjacent ends of said shafts, one of said shafts having formed therein a passage for conveying a fluid, the other of said shafts having an axial bore extending therethrough, a fluid-conducting tube positioned within said bore and insertable axially into operative engagement with said passageway, sealing and driving means at the inner end of the tube between the first said shaft and the tube, and a rotary packing gland means for said tube beyond the outer end of the second said shaft.

9. In a hoisting mechanism, the combination of a pair of rotatable shafts positioned in substantial end to end axial alignment and having their adjacent ends spaced, coupling means adapted to span the space for effecting a driving engagement between the adjacent ends of said shafts, one of said shafts having formed therein a passageway for conveying a fluid, the other of said shafts having an axial bore extending therethrough, and a fluid conducting tube positioned within said bore and adapted to traverse said space said tube being insertable axially into cooperative engagement with said passageway.

10. In a hoisting mechanism, the combination of a pair of rotatable shafts positioned substantially in coaxial alignment, coupling means for effecting driving engagement between said shafts, one of said shafts having formed therein a passageway for conveying a fluid, the other of said shafts having an axial bore extending therethrough, a resilient sleeve secured in position within said passageway, and a fluid conducting tube positioned within said bore and insertable axially into sealing relation within said resilient sleeve.

11. In a hoisting mechanism, the combination of a pair of rotatable shafts positioned substantially in coaxial alignment, coupling means for effecting driving engagement between said shafts, one of said shafts having a plurality of fluid-conducting passageways associated therewith, the other of said shafts having an axial bore extending therethrough, a fluid-conducting tube positioned within said bore, cooperating means associated with the first said shaft and the tube whereby the tube and one of the passageways may be operatively connected, a second tube encircling the first tube to define an annular conduit therebetween, resilient sealing means associated with the first said shaft whereby the annular conduit and the other of said passageways may be connected through axial movement of the outer tube, and means driven by the first shaft for driving the outer tube.

12. In a drawworks, the combination of a drum shaft rotatably supported in spaced bearings, a hoisting drum mounted on the drum shaft intermediate the bearings, said drum shaft having an overhanging portion extending beyond one of said bearing means, a stub shaft having an axial bore therethrough, means independent of the spaced bearing means for rotatably supporting said stub shaft substantially in end to end axial alignment with the overhanging portion of the drum shaft, a brake means associated with the stub shaft, self-aligning coupling means forming a driving connection between adjacent ends of said shafts whereby the brake means may act to impede rotation of the drum shaft, a fluid passageway formed in the drum shaft, a resilient sleeve secured in position within the passageway and located in the overhanging portion of the drum shaft, and a fluid conducting tube positioned within the bore of the stub shaft and insertable axially into sealing relation with the resilient sleeve.

JOHN D. SPALDING.